UNITED STATES PATENT OFFICE.

SIMON KOHN, OF VIENNA, AUSTRIA-HUNGARY, ASSIGNOR OF ONE-FOURTH TO GUSTAV POLLAK, OF VIENNA, AUSTRIA-HUNGARY.

TEXTILE-FIBER MATERIAL.

No. 805,366.      Specification of Letters Patent.      Patented Nov. 21, 1905.

Application filed March 4, 1903. Serial No. 146,081.

*To all whom it may concern:*

Be it known that I, SIMON KOHN, mercantile traveler, a subject of the Emperor of Austria-Hungary, residing at Gumpendorferstrasse 99, Vienna, VI, Austria-Hungary, have invented a certain new and useful Improvement in Textile-Fiber Material; and I do hereby declare the following to be a full, clear, and exact description of the invention, such as will enable others skilled in the art to which it appertains to make and use the same.

This invention consists in a soft and pliable textile fiber produced from sinews and tendons of animals.

It has been found that if fibers from sinews and tendons are freed from the cement-like substance containing albumin they become soft and fit for spinning. It has already been proposed to utilize the pizzles of oxen and bulls; but this is impracticable, because the same are not of a fibrous nature, consisting only of meat and skin. When pizzles are triturated or separated, the result is only a mealy, floury, or powdery mass and is by no means a workable fiber. The latter is obtainable only from sinews or tendons.

The fiber material is produced in the following manner: Animal tendons or sinews are first cleaned of all parts of skin, flesh, and fat and tanned, then dried, and hereupon separated to fibers as fine as required. The operation of the separation to fibers could be carried out in any desired manner—for instance, by rolling, pressing, striking, scraping, cutting, tearing, combing, and carding. This fiber material which is obtained in this manner could be bleached, dyed, or impregnated. It could be then worked in the usual manner to webs, textures, felts, or pressed objects—that is to say, alone or mixed with any vegetable fibers. When the material is worked hereby in untanned state, the tanning may be made with the produced products.

The described material and the products produced thereof are very tenacious and solid. They can also be produced very cheap, because the animal tendons which are used are a by-products of the butcheries.

It has already been proposed (*vide* British Patent No. 3,188 of 1860) to reduce the pizzle or genital part of bulls or oxen to the fibrous state; but, as experiment will prove, the conception therein disclosed is one founded rather on theory than on practice, for since pizzle is composed of meat and skin only there can be no workable fibrous but only a powdery product derived.

What I claim is—

1. In the manufacture of webs, textures, felts and pressed objects, fiber material consisting of animal tendons or sinews which are reduced to fibers and tanned.

2. In the manufacture of webs, textures, felt and pressed objects, fiber material consisting of animal tendons or sinews which are reduced to fibers, impregnated and tanned.

In testimony that I claim the foregoing I have hereunto set my hand this 14th day of February, 1903.

SIMON KOHN.

Witnesses:
     JOHANN FLOTH,
     ALVESTO S. HOGUE.